(12) United States Patent
Ette

(10) Patent No.: US 11,897,420 B2
(45) Date of Patent: Feb. 13, 2024

(54) METHOD FOR DOOR OR TAILGATE OPERATION IN A VEHICLE, AUTHENTICATION ELEMENT AND VEHICLE

(71) Applicant: VOLKSWAGEN AKTIENGESELLSCHAFT, Wolfsburg (DE)

(72) Inventor: Bernd Ette, Wolfsburg (DE)

(73) Assignee: VOLKSWAGEN AKTIENGESELLSCHAFT

( * ) Notice: Subject to any disclaimer, the term of this patent is extended or adjusted under 35 U.S.C. 154(b) by 380 days.

(21) Appl. No.: 16/989,988

(22) Filed: Aug. 11, 2020

(65) Prior Publication Data

US 2021/0046900 A1    Feb. 18, 2021

(30) Foreign Application Priority Data

Aug. 15, 2019  (DE) .................. 10 2019 212 231

(51) Int. Cl.
*B60R 25/00* (2013.01)
*B60R 25/24* (2013.01)
(Continued)

(52) U.S. Cl.
CPC .............. *B60R 25/24* (2013.01); *B60R 25/01* (2013.01); *B60R 25/31* (2013.01); *G06N 3/04* (2013.01); *G06N 3/08* (2013.01); *B60R 2325/10* (2013.01)

(58) Field of Classification Search
CPC ......... B60R 25/24; B60R 25/01; B60R 25/31; B60R 2325/10; G06N 3/04; G06N 3/08
See application file for complete search history.

(56) References Cited

U.S. PATENT DOCUMENTS 9,689,982 B2   6/2017 Herthan
10,095,229 B2   10/2018 Myers et al.
(Continued)

FOREIGN PATENT DOCUMENTS

CN    107719303 A    2/2018
CN    107817714 A    3/2018
(Continued)

OTHER PUBLICATIONS

K. Xia, "Design of Automobile Intelligence Control Platform Based on Bluetooth Low Energy" 2016, IEEE (Year: 2016).*
(Continued)

*Primary Examiner* — Elaine Gort
*Assistant Examiner* — Brittany Renee Peko
(74) *Attorney, Agent, or Firm* — Barnes & Thornburg LLP

(57) ABSTRACT

A method for door or tailgate operation in a transportation vehicle, wherein the transportation vehicle is equipped with an access control device with which determines whether the operating person is present with an authentication element within a proximity area around the transportation vehicle. The device is equipped with at least one communication module for wireless communication with the authentication element, wherein access authorization information is transmitted from the authentication element to the device, the information being checked in the device, and wherein access is granted to the device following verification of the access authorization. It is determined whether the operating person is located in the immediate vicinity of the door or tailgate to be operated, and whether the operating person performs an operating movement in the immediate vicinity for the door or tailgate operation.

15 Claims, 4 Drawing Sheets

(51) Int. Cl.
*G06N 3/04* (2023.01)
*B60R 25/31* (2013.01)
*B60R 25/01* (2013.01)
*G06N 3/08* (2023.01)

(56) References Cited

U.S. PATENT DOCUMENTS

| | | | |
|---|---|---|---|
| 10,328,900 B1 | 6/2019 | Yakovenko et al. | |
| 10,343,650 B1 | 7/2019 | Ahmad | |
| 10,449,929 B2 | 10/2019 | Pflug et al. | |
| 10,477,346 B2 | 11/2019 | Brückner | |
| 10,576,932 B2 | 3/2020 | Yakovenko et al. | |
| 2008/0144944 A1 | 6/2008 | Breed | |
| 2015/0284984 A1* | 10/2015 | Kanter | E05F 15/74 |
| 2017/0074000 A1* | 3/2017 | Banvait | E05B 43/005 |
| 2017/0074009 A1* | 3/2017 | Banter | E05B 81/78 |
| 2017/0102697 A1 | 4/2017 | Hassan et al. | |
| 2017/0234053 A1 | 8/2017 | Myers et al. | |
| 2017/0303084 A1 | 10/2017 | Brückner | |
| 2018/0007507 A1* | 1/2018 | Ghabra | H04W 4/023 |
| 2018/0065545 A1* | 3/2018 | McMahon | B60Q 1/50 |
| 2018/0099643 A1* | 4/2018 | Golsch | B60R 25/24 |
| 2018/0290627 A1* | 10/2018 | Hariri | B60R 24/245 |
| 2019/0156603 A1 | 5/2019 | Breer et al. | |
| 2020/0084625 A1* | 3/2020 | Kosugi | H04W 12/06 |
| 2020/0130644 A1 | 4/2020 | Heinrich | |
| 2021/0197764 A1* | 7/2021 | Siswick | B60R 25/24 |
| 2022/0057475 A1* | 2/2022 | Nakashima | G01S 5/10 |
| 2022/0089121 A1* | 3/2022 | Bonnet | B60R 25/24 |
| 2022/0210641 A1* | 6/2022 | Ohashi | H04W 12/16 |

FOREIGN PATENT DOCUMENTS

| | | |
|---|---|---|
| CN | 109383449 A | 2/2019 |
| CN | 109889989 A | 6/2019 |
| DE | 102013010993 A1 | 1/2015 |
| DE | 102017103242 A1 | 8/2017 |
| DE | 102016104670 A1 | 9/2017 |
| DE | 102016212804 A1 | 1/2018 |
| DE | 102016216053 A1 | 3/2018 |
| DE | 102017204078 A1 | 9/2018 |
| DE | 102018006821 A1 | 2/2019 |
| DE | 102018220857 A1 | 6/2019 |
| KR | 20170119650 A | 10/2017 |

OTHER PUBLICATIONS

Office Action for Chinese Patent Application No. 202010817287.2; dated Jun. 21, 2022.
Search Report for Chinese Patent Application No. 202010817287.2; dated Jun. 15, 2022.

* cited by examiner

METHOD FOR DOOR OR TAILGATE OPERATION IN A VEHICLE, AUTHENTICATION ELEMENT AND VEHICLE

PRIORITY CLAIM

This patent application claims priority to German Patent Application No. 10 2019 212 231.0, filed 15 Aug. 2019, the disclosure of which is incorporated herein by reference in its entirety.

SUMMARY

Illustrative embodiments relate to a method for door or tailgate operation in a transportation vehicle. Illustrative embodiments further relate to an authentication element and a transportation vehicle for use in the method, and a transportation vehicle.

BRIEF DESCRIPTION OF THE DRAWINGS

Disclosed embodiments are shown in the drawings and are explained in detail below with reference to the figures. In the figures.

DETAILED DESCRIPTION

Figure 1:
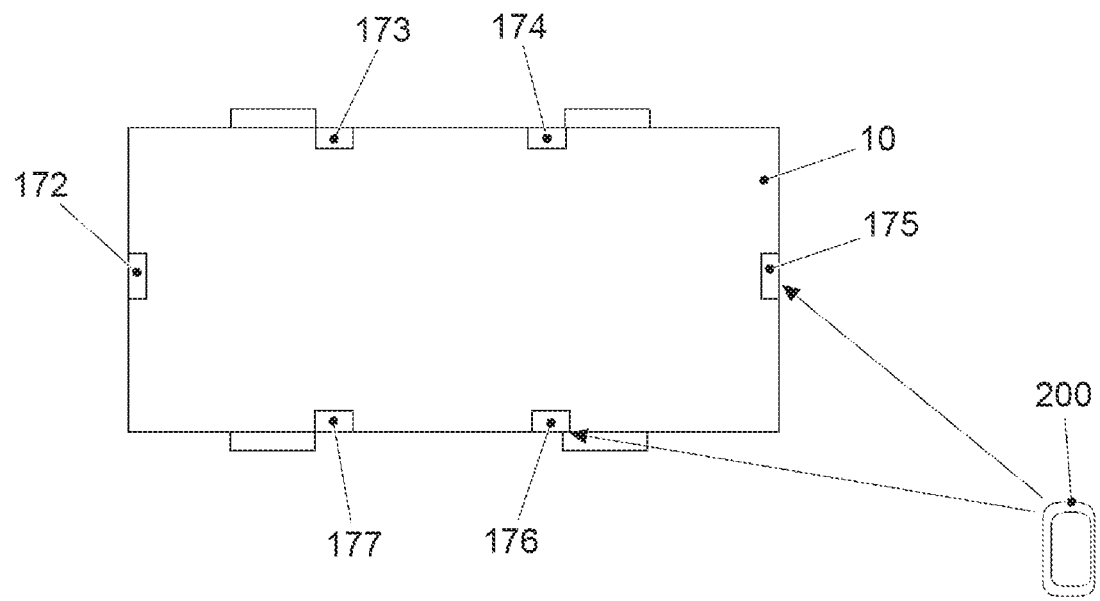
FIG. 1 shows the principle of the communication between an authentication element and a transportation vehicle.
Figure 2:
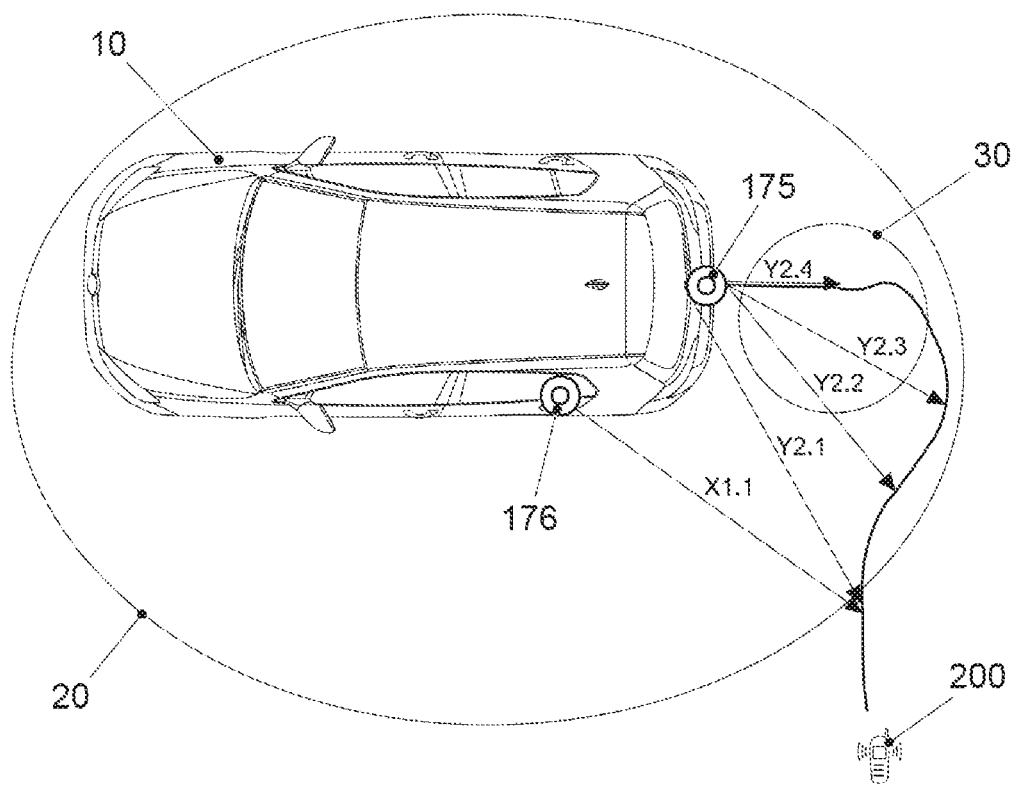
FIG. 2 shows a plurality of consecutive communications with UWB transceiver boxes of a transportation vehicle when the operating person approaches the vehicle tailgate.
Figure 3:
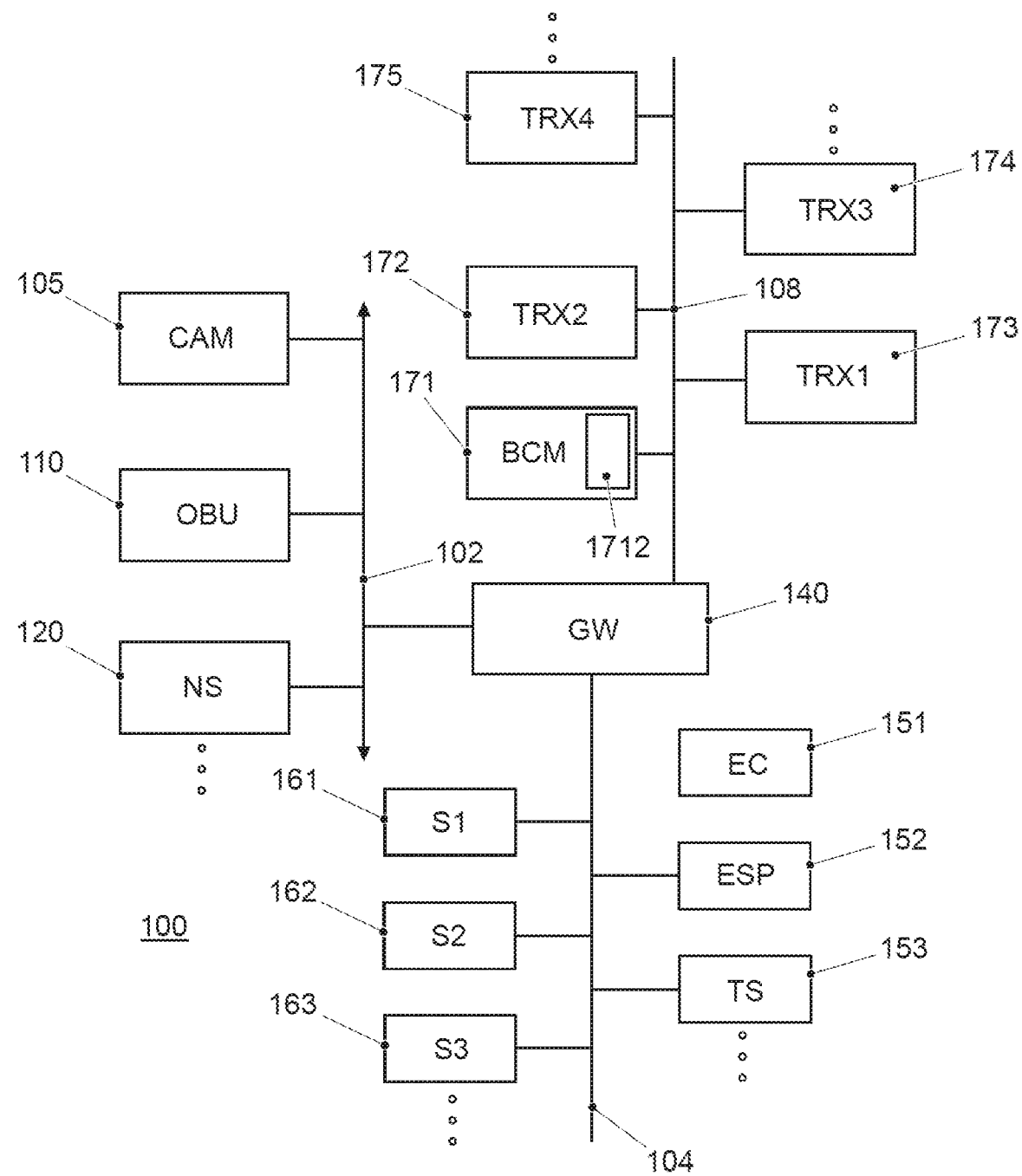
FIG. 3 shows a block diagram of the vehicle electronic system of a transportation vehicle.
Figure 4:
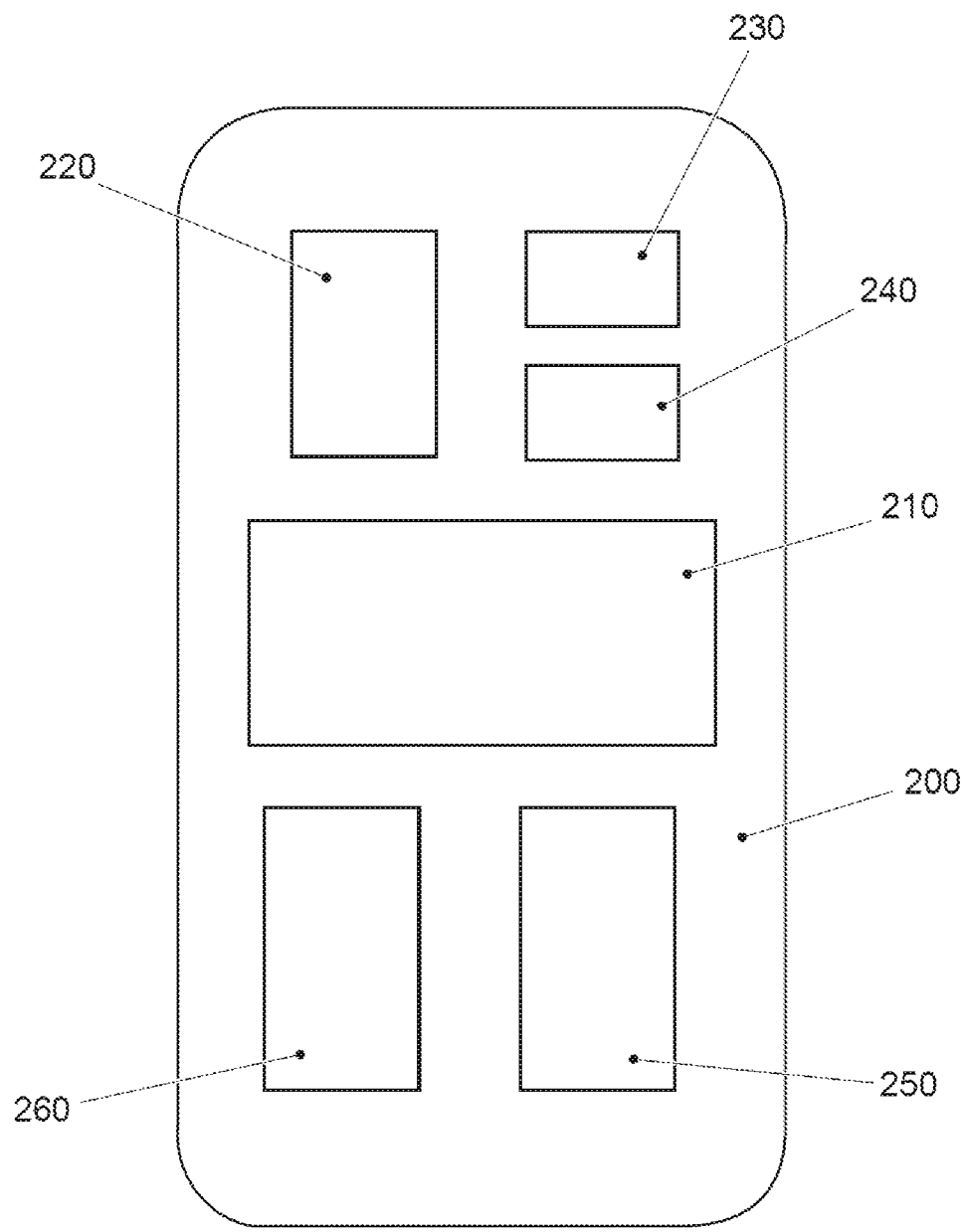
FIG. 4 shows a block diagram of a typical smartphone.
Figure 5:
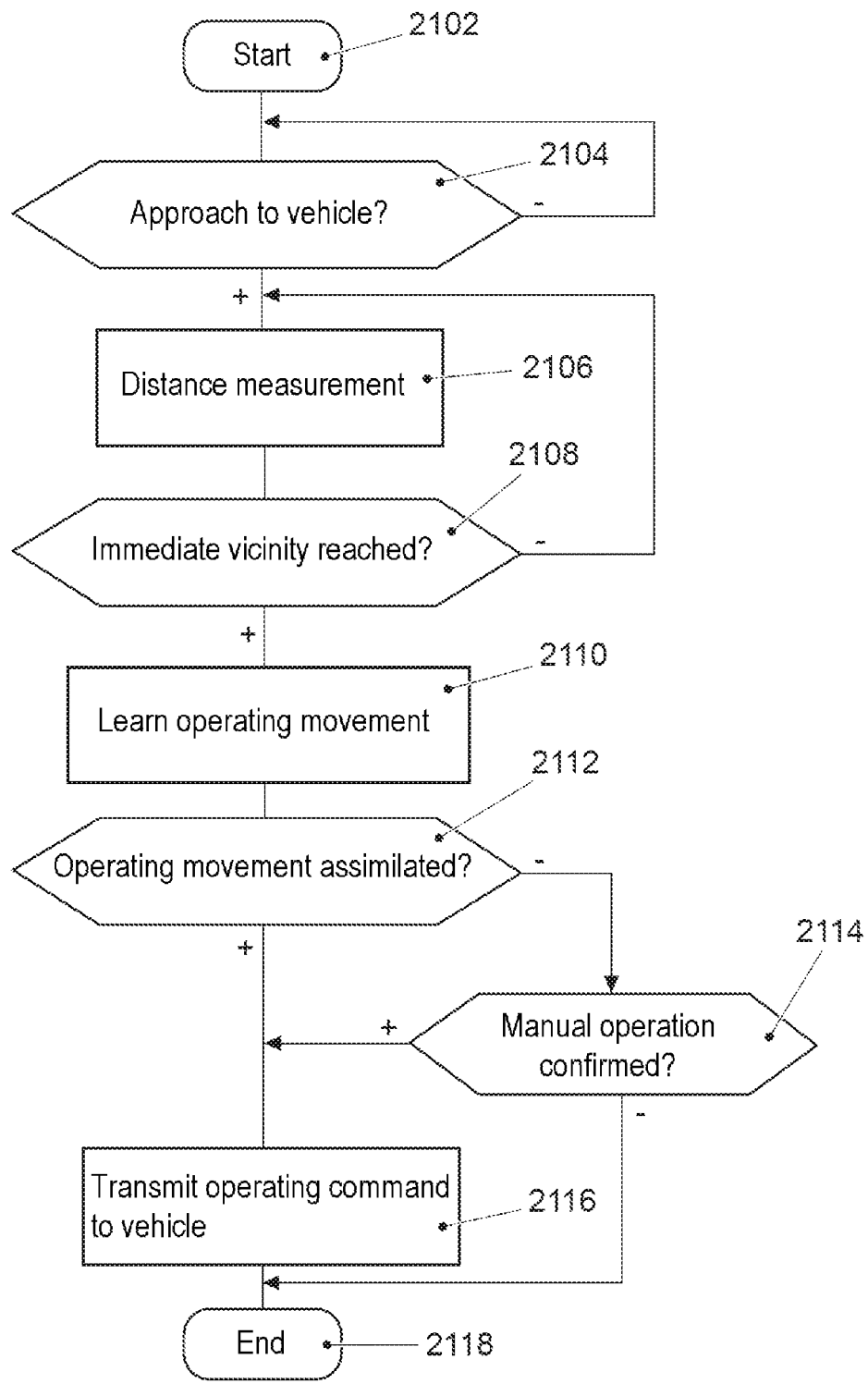
FIG. 5 shows a flow diagram of a program which is executed in a computing unit of an authentication element.

Modern transportation vehicles are equipped with increasing numbers of electrical and electronic components which increase comfort and safety. Examples are modern driver assistance systems such as:
adaptive cruise control (ACC)
lane departure warning system
lane change assistant
emergency braking assistant
congestion assistant
light assistant.

However, with the integration of modern communication technology into the transportation vehicle, new locking systems have also been developed in the access control domain. Examples of modern communication technology which are used in transportation vehicles are WiFi, BLUETOOTH® and Ultra Wide Band (UWB) for short-range radiocommunication and LTE or 5G for mobile radiocommunication.

Keyless opening systems exist which are implemented either as a remote keyless entry (RKE) solution in which the transportation vehicle owner triggers a radio command on the key or—increasingly frequently—as a passive entry passive start (PEPS) system in which it suffices to carry the key in a pocket. If the person carrying the key in a pocket enters the immediate vicinity around the transportation vehicle, this is detected by the PEPS system and the door locks are released. However, the person must still grasp the door handle to open the door.

Smart mobile devices are also increasingly used for keyless access to the transportation vehicle. These are electronic devices such as smartphones, smartwatches or data glasses which are equipped with communication technology, microcomputers and various sensors such as acceleration sensors, gyroscopes and magnetic field sensors. Furthermore, a Global Navigation Satellite System (GNSS) receiver and an air pressure sensor are also additionally used. BLUETOOTH® and also UWB are used for the radio transmission. Capacitive sensors are currently installed in the door handle or in the tailgate for the opening and closing of doors or tailgates on the transportation vehicle.

The transportation vehicle doors and tailgates are supplemented by capacitive sensors in the door handles or tailgate handles to increase convenience. These enable operation by grasping the door handle or even by performing a kicking movement with the foot at the tailgate.

However, this entails some drawbacks:
1. The capacitive sensor system must be installed in the transportation vehicle and also incurs additional assembly costs.
2. The operating action is only possible in each case right next to the transportation vehicle and must be accompanied by a foot movement, particularly in the operation of the tailgate.
3. The operation of the tailgate by a foot movement at the tailgate is not intuitive and the person must execute this kicking movement as an additional operating action. The person may even begin to stumble if approaching the transportation vehicle with baggage.

DE 10 2018 006 821 A1 shows a solution in which initially in operation a) a location of an intelligent key, a time of initiation of a function of the transportation vehicle to be triggered by the key and/or a movement profile of the key is/are captured as profile information in connection with the initiation of the function of the transportation vehicle. In an operation b), the function of the transportation vehicle is initiated in the event of a rescanning of the key depending on the profile information captured in operation a). The habits of the transportation vehicle owner learnt in this way can be stored as the profile information. These habits which can be stored in the profile information may be linked to the desired function of the transportation vehicle. The desired function is the function which the transportation vehicle owner is accustomed to selecting. It is possible that, in operation b), the function of the transportation vehicle is initiated immediately or it can also be provided that the key offers the transportation vehicle owner a selection concerning the function that is to be initiated.

A vehicle-opening system and method are known from US 2017/0074000 A1. An unlocking algorithm learns the unlocking of the door of a user on the basis of the different factors of the user behavior and predicts the intention of the user when approaching the transportation vehicle. The evaluation can be performed with a neural network. On this basis, the system describes methods for the automatic unlocking of the corresponding doors, trunk or tailgate. As a result, the user may no longer need to actuate a key fob or other unlocking device.

A vehicle-opening system and method are known from US 2017/0234053 A1. An unlocking algorithm learns the unlocking of the door of a user on the basis of the different factors of the user behavior and predicts the intention of the user when approaching the transportation vehicle. To do this, the approach behavior of the user is monitored and evaluated by cameras and microphones installed in the transportation vehicle. The evaluation can be performed with a neural network. On this basis, the system describes methods for the automatic unlocking of the corresponding doors, trunk or tailgate.

However, these solutions have the down side that the operating person must approach the transportation vehicle on a specific trajectory so that his intention can be detected. Depending on the vehicle environment, particularly due to the parking space situation, it is not always possible for the person always to approach on the same trajectory. Substantial computing power is also required for the image evaluations if cameras are used to observe the user behavior.

The need therefore exists for further measures which increase operating convenience for the customer and reduce the installation outlay in the transportation vehicle.

This is achieved by a method for door or tailgate operation in a transportation vehicle, an authentication element for use in the method, and a transportation vehicle.

Until recently, a mix of wireless communication technologies has been used for RKE/PEPS systems: In the LF range (e.g., 125 kHz), a beacon signal has been used to wake up the components. The UHF range (e.g., 433 MHz) has been used for encrypted communication. Finally, the LF range (e.g., 21 kHz) has been used for a magnetic compass system inside the transportation vehicle to check whether the key is located inside or outside. Since these systems have proven to be vulnerable, the trend has since moved toward a solution with only one radio standard based on UWB (Ultra-Wide Band) in the frequency range from 3.1 GHz to 10.6 GHz in which different bands are provided for this purpose.

The disclosed solution relates to a method for door or tailgate operation in a transportation vehicle, wherein the transportation vehicle is equipped with an access control device with which it is determined whether the operating person is present with an authentication element within a monitoring range around the transportation vehicle, wherein the device is equipped with at least one communication module which is designed for wireless communication with the authentication element, wherein access authorization information is transmitted from the authentication element to the device and is checked in the device, wherein, following verification of the access authorization information, access is granted to the device, wherein it is determined whether the operating person is located in the immediate vicinity of the door or tailgate to be operated, it is determined whether the operating person performs an operating movement in the immediate vicinity for the door or tailgate operation, and the door or tailgate operating procedure is triggered if the performance of the operating movement is verified.

The solution increases convenience for the user while simultaneously reducing the installation outlay in the transportation vehicle. The user no longer needs to follow the same path to the transportation vehicle so that the door or tailgate is automatically opened. The user enjoys greater freedom in the selection of his operating movement and it suffices to perform this movement in the immediate vicinity of the transportation vehicle. A plurality of different movements relating to the same operating action can be trained. The operating person can train a different gesture depending on load status.

In at least one disclosed embodiment, the training of operating movements is supported by the use of a neural network in the authentication element.

The neural network also serves to detect the performance of the operating movement by the driver or a different operating person. Since this is performed in the authentication element, information relating to the tailgate operating procedure must be transmitted to the access control device if the performance of the operating movement is verified by the authentication element.

As mentioned, it is beneficial if the operating movement is performed in the immediate vicinity of the transportation vehicle. It is thus beneficial if the detection of the immediate vicinity is based on a distance measurement which the authentication element performs by a propagation time measurement of signals which are transmitted between the authentication element and the communication module.

For this purpose, it is beneficial if the authentication element and the communication module are designed for communication with ultra-wideband signals (UWB signals), and the propagation time measurement is performed with UWB signals. UWB is a general designation for very short, pulsed low-energy signals which use a wide bandwidth of more than 500 MHz. The reciprocal relationship between time and bandwidth is the main reason for the choice of this method, since the signal duration can be correspondingly short due to the investment in bandwidth. This in turn is desirable for a plurality of reasons. On the one hand, pulse durations in the nanosecond range do not result in the superimposition of the original signal with reflections, thus guaranteeing the purity of the signal. On the other hand, due to the temporal definition of the pulses, their propagation time and therefore the transmitter distance can be precisely determined, so that the complex magnetic field measurement for the position determination of the key can be eliminated. The fact that UWB radiocommunication furthermore operates with very low transmit powers and signal-to noise ratios extends battery life, avoids interference to other radiocommunication users and limits the range, thereby hindering an interception of the signal by hackers. A further benefit is also that the UWB transceivers that are used can also be effectively employed for distance measurements. A distance measurement of this type with UWB signals transmitted in the frequency range between 3.1 and 10.6 GHz which is permitted for UWB communication is based on a propagation time measurement. This measurement is also known by the term time-of-flight measurement (TOF). Since the measurement takes place in the decimetric wave range, the measurement is also accurate to within 10 cm under visibility conditions, also referred to as line-of-sight (LOS) conditions.

Finally, the door or tailgate needs to be opened. For this purpose, it is beneficial for the device to have an access authorization control module which initiates the door or tailgate operating procedure after it has received the information relating to the tailgate operating procedure from the authentication element. In the transportation vehicle technology domain, this component is referred to internationally as the body control module (BCM).

For the internal selection of the learnt operating movements in the authentication element, it is beneficial if a preselection of the learnt operating movements can be made by which the number of possible comparisons is reduced. In at least one disclosed embodiment, this can happen in such a way that consecutive UWB signals are transmitted during the approach to the transportation vehicle and are answered by the at least one communication module, and the authentication element selects the operating movement test which is valid for the associated communication module whose communication with the authentication element consecutively results in the shortest propagation time measurement. This does not create an increased computing requirement in which further features have to be taken into account in the synapses of the neural network.

For an authentication element for use in the disclosed method, it is beneficial if the authentication element transmits access authorization information from the authentication element to an access control device of a transportation vehicle, wherein the authentication element has a neural network for learning an operating movement for the operation of a door or tailgate of a transportation vehicle, further having communication methods or mechanisms which determine whether the operating person is located in the immediate vicinity of the door or tailgate to be operated, and the neural network is used to determine whether the operating person performs an operating movement in the immediate vicinity for the door or tailgate operation, and the authentication element has a communication method or mechanism which transmits information relating to the tailgate operating procedure to the access control device if the performance of the operating movement is verified.

The authentication element can be integrated into a mobile communication device, in particular, a smartphone, smartwatch or data glasses. Mobile devices of this type already have the necessary equipment with acceleration sensors, communication module and high-performance CPU for the implementation of the neural network. It is furthermore beneficial if the authentication element is similarly designed for UWB communication.

The proposal similarly relates to a transportation vehicle in which an access control device is installed which, after receiving access authorization information from an authentication element, performs an operating procedure for a transportation vehicle door or tailgate if information relating to the door or tailgate operating procedure has been received.

The present description illustrates the principles of the disclosure. Persons skilled in the art will therefore obviously be capable of designing a variety of arrangements which are not explicitly described here, but embody principles of the disclosure and are similarly intended to be fully protected.

REFERENCE NUMBER LIST

10 Transportation vehicle
20 Proximity area
30 Immediate vicinity
100 Block diagram of vehicle electronic system
102 Ethernet bus
105 Camera
104 CAN bus
108 CAN bus
110 On-board unit
120 Navigation system
140 Gateway
151 Engine control unit
152 ESP control unit
153 Transmission control unit
161 Sensor 1
162 Sensor 2
163 Sensor 3
171 Body control module
172 1. UWB transceiver box
173 2. UWB transceiver box
174 3. UWB transceiver box
175 4. UWB transceiver box
176 5. UWB transceiver box
177 6. UWB transceiver box
1712 Access authorization control module
200 Authentication element
210 CPU
220 Communication module
230 Inertial measurement unit
240 GNSS receive unit
250 Touchscreen
260 Memory
2102-2118 Various program operations of a computer program

The invention claimed is:

1. An authentication element configured to transmit access authorization information from the authentication element to an access control device of a transportation vehicle, wherein the authentication element comprises:
   a neural network for learning a plurality of operating movements for the operation of a door or tailgate of a transportation vehicle; and
   communication equipment configured to determine whether an operating person is located in an immediate vicinity of the door or tailgate to be operated,
   wherein the neural network determines whether the operating person performs a learned operating movement in the immediate vicinity for the door or tailgate operation, wherein, for checking whether the operating person performs a learned operating movement in the immediate vicinity for the door or tailgate operation, a preselection of a number less than a total of learned operating movements is made in which the authentication element selects the preselection of learned operating movements which are valid for an associated communication module on the transportation vehicle whose communication with the authentication element consecutively results in the shortest propagation time measurement to compare against movement of the operating person, wherein the communication equipment transmits information relating to the tailgate operating procedure to the access control device in response to the performance of the operating movement being verified, and
   wherein the authentication element transmits consecutive ultra-wideband signals (UWB) signals during the approach to the transportation vehicle and the signals are answered by at least one communication module included in the access control device.

2. The authentication element of claim 1, wherein the authentication element is integrated into a mobile communication device.

3. The authentication element of claim 1, wherein the operating movement is learned by the neural network in the authentication element.

4. The authentication element of claim 3, wherein the performance of the operating movement is detected by the neural network in the authentication element and information relating to the tailgate operating procedure is transmitted to the device in response to the performance of the operating movement being verified.

5. The authentication element of claim 1, wherein the detection of the immediate vicinity is based on a distance measurement which the authentication element performs by a propagation time measurement of signals which are transmitted between the authentication element and the communication module.

6. The authentication element of claim 5, wherein the authentication element and the communication module communicate with ultra-wideband signals (UWB signals), and the propagation time measurement is performed with UWB signals.

7. The authentication element of claim 1, wherein the device has an access authorization control module which initiates the door or tailgate operating procedure after it has received the information relating to the tailgate operating procedure from the authentication element.

8. A method for door or tailgate operation in a transportation vehicle, wherein the transportation vehicle is equipped with an access control device configured to determining whether an operating person is present within a monitoring range around the transportation vehicle using an authentication element, wherein the access control device is equipped with at least one communication module for wireless communication with the authentication element, the method comprising:

transmitting access authorization information from the authentication element to the access control device;

checking the transmitted access authorization information in the access control device;

granting access to the access control device in response to verification of the access authorization information, determining whether the operating person is located in the immediate vicinity of the door or tailgate to be operated;

determining whether the operating person performs an operating movement in the immediate vicinity for the door or tailgate operation;

triggering the door or tailgate operating procedure in response to the performance of the operating movement being verified, wherein the authentication element transmits consecutive UWB signals during the approach to the transportation vehicle and the signals are answered by the at least one communication module, and wherein, for checking whether the operating person performs a learned operating movement in the immediate vicinity for the door or tailgate operation, a preselection of a number less than a total of learned operating movements is made in which the authentication element selects the preselection of learned operating movements which are valid for an associated communication module on the transportation vehicle whose communication with the authentication element consecutively results in the shortest propagation time measurement to compare against movement of the operating person.

9. The method of claim 8, wherein the operating movement is learned by a neural network in the authentication element.

10. The method of claim 9, wherein the performance of the operating movement is detected by the neural network in the authentication element and information relating to the tailgate operating procedure is transmitted to the device in response to the performance of the operating movement being verified.

11. The method of claim 8, wherein the detection of the immediate vicinity is based on a distance measurement which the authentication element performs by a propagation time measurement of signals which are transmitted between the authentication element and the communication module.

12. The method of claim 11, wherein the authentication element and the communication module communicate with ultra-wideband signals (UWB signals), and the propagation time measurement is performed with UWB signals.

13. The method of claim 8, wherein the device has an access authorization control module which initiates the door or tailgate operating procedure after it has received the information relating to the tailgate operating procedure from the authentication element.

14. The authentication element of claim 1, further comprising a proximity area during which the distance is measured until the immediate vicinity where the operating movement can be executed has been determined to be reached.

15. the method of claim 8, further comprising a proximity area during which the distance is measured based on the transmitted UWB signals and answer until the immediate vicinity where the operating movement can be executed has been determined to be reached.

* * * * *